(12) United States Patent
Nasu et al.

(10) Patent No.: US 9,116,317 B2
(45) Date of Patent: Aug. 25, 2015

(54) PLANAR LIGHTWAVE CIRCUIT

(75) Inventors: Yusuke Nasu, Atsugi (JP); Ryoichi Kasahara, Atsugi (JP); Ikuo Ogawa, Atsugi (JP); Kenya Suzuki, Yokohama (JP); Fumihiro Ebisawa, Yokohama (JP)

(73) Assignees: NIPPON TELEGRAPH AND TELEPHONE CORPORATION, Tokyo (JP); NTT ELECTRONICS CORPORATION, Yokohama-Shi, Kanagawa (JP)

( * ) Notice: Subject to any disclaimer, the term of this patent is extended or adjusted under 35 U.S.C. 154(b) by 286 days.

(21) Appl. No.: 13/528,476

(22) Filed: Jun. 20, 2012

(65) Prior Publication Data
US 2012/0328236 A1 Dec. 27, 2012

(51) Int. Cl.
*G02B 6/30* (2006.01)
*G02B 6/42* (2006.01)
*G02B 6/35* (2006.01)
*G02B 6/12* (2006.01)

(52) U.S. Cl.
CPC ............ *G02B 6/4267* (2013.01); *G02B 6/3508* (2013.01); *G02B 6/12033* (2013.01)

(58) Field of Classification Search
CPC ........ G02B 6/42; G02B 6/422; G02B 6/4201; G02B 6/12019; H01L 2224/48472
See application file for complete search history.

(56) References Cited

U.S. PATENT DOCUMENTS 6,567,590 B1 * 5/2003 Okada et al. .................. 385/49
6,970,628 B2 * 11/2005 Boudreau ..................... 385/52
8,750,659 B2 6/2014 Ban
2010/0322569 A1 12/2010 Ohyama et al.
2012/0219251 A1 8/2012 Kuroda et al.

FOREIGN PATENT DOCUMENTS

| CN | 1453599 | 11/2003 |
|---|---|---|
| CN | 201252099 | 6/2009 |
| JP | 10-160960 | 6/1998 |
| JP | H11-183740 | 7/1999 |
| JP | 2001-074972 | 3/2001 |
| JP | 2001-272572 | 10/2001 |

(Continued)

OTHER PUBLICATIONS

Notice of Allowance dated Oct. 8, 2013 in corresponding Japanese Patent Application No. 2011-138924.
Office Action dated Apr. 30, 2013 from corresponding Japanese Application No. 2011-138924.
Office Action in corresponding Chinese Patent Application No. 201210211244.8 dated Feb. 24, 2012.

(Continued)

*Primary Examiner* — Ryan Lepisto
*Assistant Examiner* — Erin Chiem
(74) *Attorney, Agent, or Firm* — Workman Nydegger

(57) ABSTRACT

In an integrated optical receiver or transmitter, both the displacement of an optical axis caused by thermal changes and the property degradation of an optical functional circuit are inhibited. A planar lightwave circuit having a substrate and a waveguide-type optical functional circuit formed thereon composed of a material different from that of the substrate, and includes a waveguide region formed only of an optical wavelength that is in contact with a side forming an emission-end face of the optical waveguide for propagating the light emitted from the optical functional circuit or an incident-end face of an optical waveguide for propagating the light incident on the optical functional circuit. The planar lightwave circuit is fixed to a fixing mount only at the bottom of the substrate where the waveguide region is formed.

3 Claims, 11 Drawing Sheets

(56) References Cited

FOREIGN PATENT DOCUMENTS

| | | |
|---|---|---|
| JP | 2003-222733 | 8/2003 |
| JP | 2006-243391 | 9/2006 |
| JP | 2008-216463 | 9/2008 |
| JP | 2009-175364 | 8/2009 |
| JP | 2009-265188 | 11/2009 |
| JP | 4960294 | 6/2012 |
| WO | 2009/001958 | 12/2008 |
| WO | 2010/082524 | 7/2010 |

OTHER PUBLICATIONS

U.S. Appl. No. 14/149,386, Feb. 9, 2015, Office Action.
Office Action in corresponding Chinese Application No. 201410011481.6 dated Apr. 3, 2015.
Office Action in corresponding Japanese Application No. 2013-002991 dated Apr. 21, 2015.
Seno, et., al, "Spatial beam transformer for wavelength selective switch consisting of silica-based planar lightwave circuit," OFC/NFOEC Technical Digest, Optical Society of America, 2012, 3 pages.

* cited by examiner

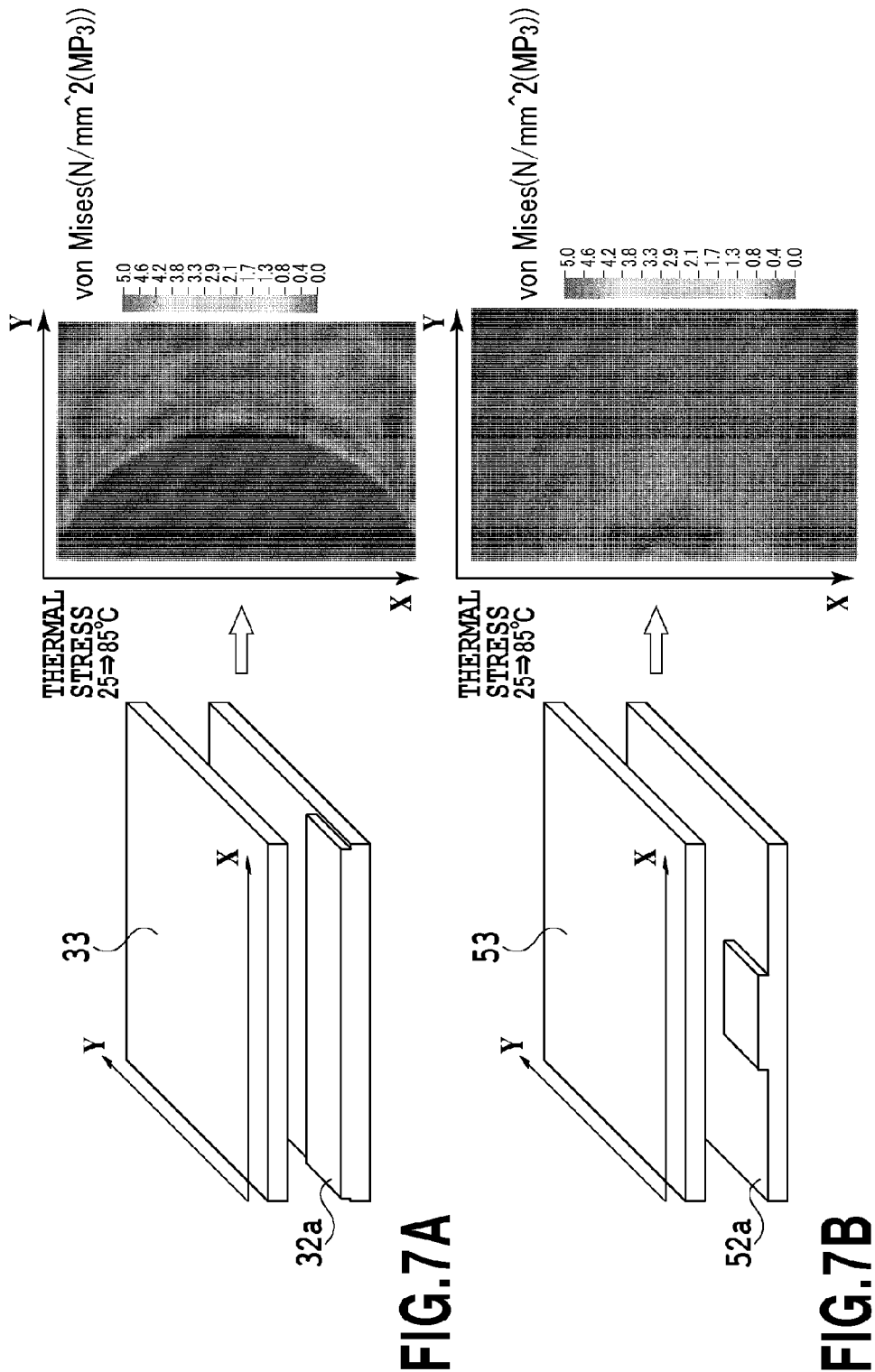

PLANAR LIGHTWAVE CIRCUIT

CROSS-REFERENCE TO RELATED APPLICATIONS

This application claims the benefit of Japanese Patent Application No. 2011-138924 filed Jun. 22, 2011, which is hereby incorporated by reference herein in its entirety.

BACKGROUND OF THE INVENTION

1. Field of the Invention

The present invention relates to a planar lightwave circuit comprising an optical transceiver integrated with a light-emitting element or a light-receiving element.

2. Description of the Related Art

The development of optical components is becoming increasingly important with advances in the optical communication technology. Above all, an optical transceiver has been contemplated to increase transmission speed and response speed, thereby increasing its communication capacity. A commonly used transceiver comprises a light-emitting element or a light-receiving element formed by using an optical semiconductor and an optical fiber for input or output that are optically coupled through a lens. In an optical receiver, for example, light emitted from an optical fiber at the input side focuses on the light-receiving element through the lens and is detected by direct detection (intensity detection).

For a modulation/demodulation processing technique in an optical transmission system, signal transmission using a phase modulation scheme has been widely practiced. A phase shift keying (PSK) scheme is a scheme for transmitting signals by modulating the optical phase. With this scheme, transmission capacity has been increasing exponentially by multilevel modulation.

In order to receive such PSK signals, detection of optical phase is required. A light-receiving element is capable of detecting intensity of signal light but is incapable of detecting optical phase, and thus a method for converting optical phase to optical intensity is required. Such a method can be a method for detecting phase difference by using optical interference. With this method, the signal light is interfered with another light (reference light) and the optical intensity of the interfering light is detected by a light-receiving element to obtain optical phase information. Here, the detection may be coherent detection using separately provided light source as reference light or differential detection for splitting a portion of the signal light itself as reference light to be interfered with the signal light. As described above, a recent PSK optical receiver requires an optical interferometer for converting phase information to intensity information by optical interference which is different from the conventional optical receiver using only an intensity modulation scheme.

Such an optical interferometer can be implemented by using a planar lightwave circuit (PLC). The planar lightwave circuit has an advantageous feature in terms of mass productivity, low cost, and high reliability, which allows to implement various optical interferometers. An optical delay line interferometer, a 90-degree hybrid circuit, etc. are implemented as the optical interferometer used in the PSK optical receiver for practical use. Such a planar lightwave circuit can be formed by glass deposition techniques such as a standard photolithography method, an etching technique, and flame hydrolysis deposition (FHD).

In view of a specific forming process, an underclad layer comprised mainly of silica glass and a core layer having a refractive index higher than that of a clad layer are firstly deposited on a substrate such as Si. Then, various waveguide patterns are formed on the core layer to finally embed the waveguide formed of the core layer in an overcladding layer. Such a process is performed to form a waveguide-type optical functional circuit. The signal light is confined in the waveguide formed via the above process and is propagated inside the planar lightwave circuit.

FIG. 1 illustrates a method for optically connecting a conventional planar lightwave circuit and an optical receiver. In view of the method for optically connecting a planar lightwave circuit in a PSK optical receiver and an optical receiver, the basic connection therebetween is a simple fiber connection as illustrated in FIG. 1. Here, a planar lightwave circuit 1 with each of its end connected to optical fibers 3a and 3b is interconnected with an optical receiver 2 having an input optical fiber 3b by optical fibers to provide optical coupling therebetween. The number of optical fibers used for optical coupling can be determined by the number of output lights outputted from the planar lightwave circuit which may be more than one. However, there has been a problem that the optical receiver using such optical fiber connection is increased in size. To get around this problem, the output of the planar lightwave circuit and the input of the optical receiver are optically coupled directly by using a lens to be integrated into one package for downsizing. The above-mentioned optical receiver in which a planar lightwave circuit and an optical receiver are optically coupled directly is called an integrated optical receiver.

A method for fixing the planar lightwave circuit becomes critical to implement the integrated optical receiver. In the case where the light outputted from the planar lightwave circuit is propagated in space to have optically coupled to the light-receiving element by a lens or the like, all the lights may not be received by the light-receiving element if there are changes in the positional relationships among the light emitting end, the lens, and the light-receiving element. Thus, this leads a problem of loss of light. In particular, the positions of the above are varied due to thermal expansions if there are changes in the temperature of the package for housing the optical receiver, ambient temperature, temperature of each element, etc. As a result, the above problem becomes more pronounced. Therefore, in order to carry out optical coupling with low loss, each positional relationship should not be varied at least in relative terms even if there is a change in the ambient temperature.

In particular, change in the shape of the planar lightwave circuit due to thermal expansion caused by change in the ambient temperature is substantially greater that of the light-receiving element. Further, the area of the planar lightwave circuit occupied in the optical receiver is larger than that of the light-receiving element by one to two orders of magnitude, and the shape change in the planar lightwave circuit due to thermal expansion is also greater than that in the light-receiving element by one to two orders of magnitude. In addition, there is a great difference in the thermal expansion coefficients between the substrate forming the planar lightwave circuit and the deposited thin glass, thereby causing significant warping due to thermal changes. Accordingly, the displacement of light emitted from the planar lightwave circuit and change in the emission angle with respect to the light-receiving element are even more problematic. These two changes bring about changes in the positions and angles of light emitted from the planar lightwave circuit, thereby causing displacement of an optical axis. The displacement of the optical axis causes degradation in optical coupling to the light-receiving element and losses in the optical coupling. For the implementation of the integrated optical receiver, it is critical that such displacement of the optical axis be resolved and be free from adverse effect.

FIG. 2 illustrates the inner structure of the conventional integrated optical receiver. A method for firmly fixing almost the entire bottom surface of the planar lightwave circuit is known to prevent the cause of aforementioned displacement of an optical axis due to the thermal changes. In the integrated optical receiver illustrated in FIG. 2, a planar lightwave circuit 13 forming an optical interferometer thereon as an optical functional circuit, a lens 14, and a light-receiving element 15 are respectively fixed to a base substrate 11 by fixing mounts 12a, 12b, and 12c serving as supporting members. An optical fiber 16 and the planar lightwave circuit 13 are connected through an optical fiber fixing component 17. In the integrated optical receiver, the light inputted from the optical fiber 16 is interfered in the planar lightwave circuit 13 to be coupled to the light-receiving element 15 by the lens 14.

The fixing mount 12a and the planar lightwave circuit 13 are fixed by an adhesive 18 or solder. Almost the entire bottom surface of the planar lightwave circuit 13 is firmly fixed to the fixing mount to limit the thermal expansion and warping changes. Further, the lens 14 and the light-receiving element 15 are also fixed to the fixing mounts to prevent displacement of an optical axis due to thermal changes.

The structure of FIG. 2 allows to substantially inhibit the displacement of an optical axis due to thermal changes while property change in the planar lightwave circuit due to thermal changes becomes prominent. As mentioned previously, the planar lightwave circuit 13 is composed of an Si substrate 13a and a silica glass layer 13b having a great difference in the thermal expansion coefficients therebetween. As a result, warping change and thermal expansion due to thermal changes become significant. In the structure illustrated in FIG. 2, the entire bottom surface of the planar lightwave circuit 13 is fixed to limit thermal expansion and warping changes.

Meanwhile, in such a structure, high thermal stress is generated between the Si substrate 13a and the silica glass layer 13b. The stress causes refractive index change inside the silica glass layer 13b through the photo-elastic effect. The optical interferometer formed in the planar lightwave circuit 13 has the length of the waveguide and the refractive index precisely adjusted to control the interference property. The refractive index change caused by the stress brings about changes in the equivalent circuit length and the property of the interferometer, thereby causing degradation in the property of the optical interferometer.

In this regard, the use of an elastic adhesive, a soft adhesive such as paste, or fixing paste as an adhesive 18 for limiting changes in the optical property by reducing thermal stresses (see, for example, Japanese Patent Application Laid-open No. 2009-175364) causes prominent effect of the aforementioned displacement of an optical axis and causes losses.

SUMMARY OF INVENTION

An object of the present invention is to provide, in an integrated optical receiver or transmitter, a planar lightwave circuit capable of inhibiting both the displacement of an optical axis caused by thermal changes and property degradation in an optical functional circuit.

To achieve the above object, one embodiment of the present invention provides a planar lightwave circuit having a waveguide-type optical functional circuit formed on a substrate. The planar lightwave circuit comprises a waveguide region formed only of an optical wavelength that is in contact with a side forming an emission-end face of the optical waveguide for propagating the light emitted from the optical functional circuit or an incident-end face of an optical waveguide for propagating the light incident on the optical functional circuit. Here, the planar lightwave circuit is fixed to the fixing mount only at a portion of the bottom of the substrate where the waveguide region is formed.

Another embodiment provides a planar lightwave circuit having a waveguide-type optical functional circuit formed on a substrate. An intermediate fixing mount at an emission-end face of the optical waveguide for propagating the light emitted from the optical functional circuit or an incident-end face of an optical waveguide for propagating the light incident on the optical functional circuit is fixed to an intermediate fixing mount. Here, the intermediate fixing mount is composed of a material which transmits the emitted light or the incident light and is fixed to the fixing mount.

Yet another embodiment provides a planar lightwave circuit having a waveguide-type optical functional circuit formed on a substrate. An intermediate fixing mount at an emission-end face of the optical waveguide for propagating the light emitted from the optical functional circuit or an incident-end face of an optical waveguide for propagating the light incident on the optical functional circuit is fixed to an intermediate fixing mount. Here, the intermediate fixing mount has a part formed of a window composed of a material to transmit the emitted light or the incident light, or a part formed of a cutout provided to transmit the emitted light or the incident light, and is fixed to the fixing mount.

As described above, in the integrated optical receiver or transmitter, the only waveguide region for input/output of light in the optical circuit on the planar lightwave circuit which should be firmly fixed to specifically prevent displacement of an optical axis, is fixed to the fixing mount. With the above structure, both the displacement of an optical axis caused by thermal changes and the property degradation in the optical functional circuit can be inhibited.

Further features of the present invention will become apparent from the following description of exemplary embodiments (with reference to the attached drawings).

BRIEF DESCRIPTION OF THE DRAWINGS

FIGS. 7A and 7B illustrate stress analysis of the planar lightwave circuit in accordance with First and Third Embodiments;

DESCRIPTION OF THE EMBODIMENTS

Embodiments of the present invention will now be described in detail with reference to the accompanying drawings. In the embodiments, an integrated optical receiver is described by way of example, and it is apparent that the present invention is applicable to an optical transmitter by substituting, for example, the light-receiving element for light-emitting element, the emitted light for incident light, and the emission-end face for incident-end face.

In the embodiments, the only waveguide region for input/output of light in the optical circuit on the planar lightwave circuit which should be firmly fixed to specifically prevent displacement of an optical axis, is fixed to the fixing mount. The region formed of an optical functional circuit such as an optical interferometer susceptible to stress is not fixed to the fixing mount. This allows to minimize the effect of stresses at the optical functional circuit even if distortion and warping are caused due to thermal changes. As a result, the property degradation in the optical functional circuit can be inhibited. Further, the waveguide region is fixed to the fixing mount, and thus displacement of an optical axis caused by thermal changes can be inhibited and operating margin for thermal changes can be increased as an optical transceiver.

If the operating margin for thermal changes is increased, a requirement for a constant-temperature device such as a Peltier element provided in the optical transceiver is relaxed whereby the cost and the power consumption of the optical transceiver can be reduced.

First Embodiment

Figure 1:
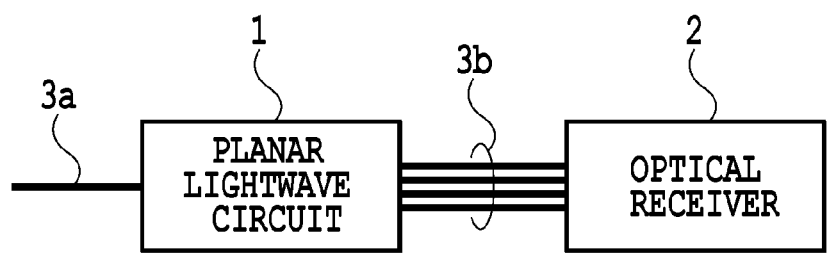
FIG. 1 illustrates a method for optically connecting a conventional planar lightwave circuit and an optical receiver.
Figure 2:
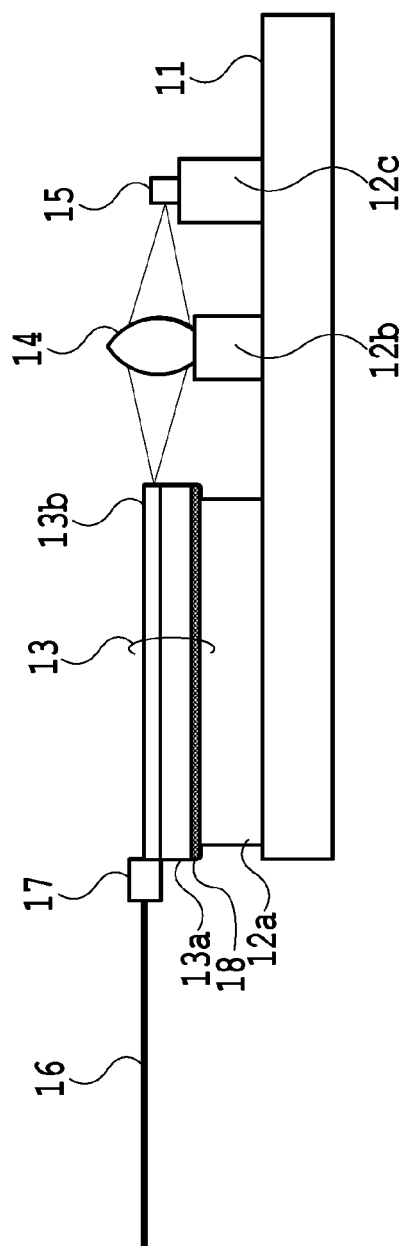
FIG. 2 illustrates the inner structure of a conventional integrated optical receiver.
Figure 3:
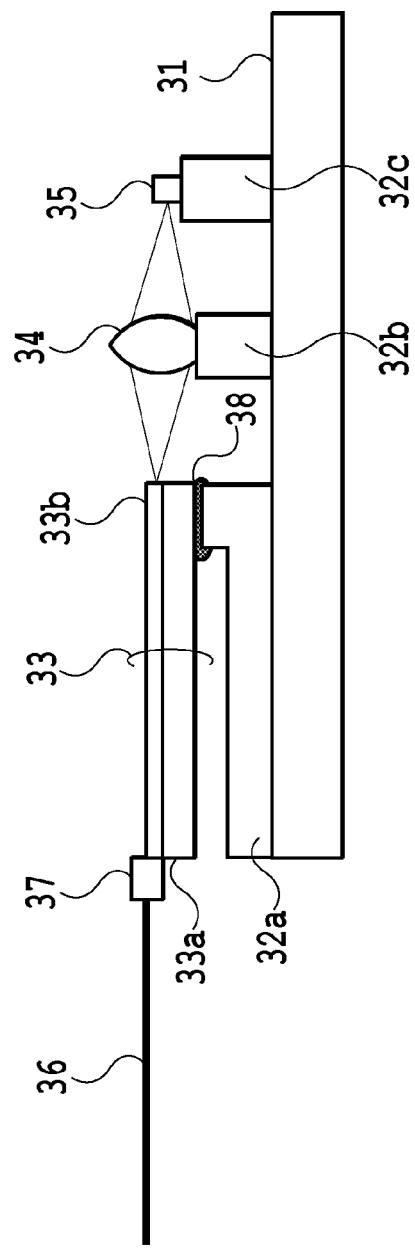
FIG. 3 illustrates the inner structure of the integrated optical receiver in accordance with First Embodiment of the present invention.

FIG. 3 illustrates the inner structure of the integrated optical receiver in accordance with First Embodiment of the present invention. A planar lightwave circuit 33 forming an optical interferometer thereon as an optical functional circuit, a lens 34, and a light-receiving element 35 are respectively fixed to a base substrate 31 by fixing mounts 32a, 32b, and 32c serving as supporting members. The optical fiber 36 and the planar lightwave circuit 33 are connected through the optical fiber fixing component 37. In the integrated optical receiver, the light inputted from the optical fiber 36 is coupled to the light-receiving element 35 through the lens 34 after optical signal processing such as interference in the planar lightwave circuit 33. The planar lightwave circuit 33 has a silica glass layer 33b formed of a waveguide-type optical functional circuit of a core layer and a clad layer stacked over an Si substrate 33a.

Figure 4A:
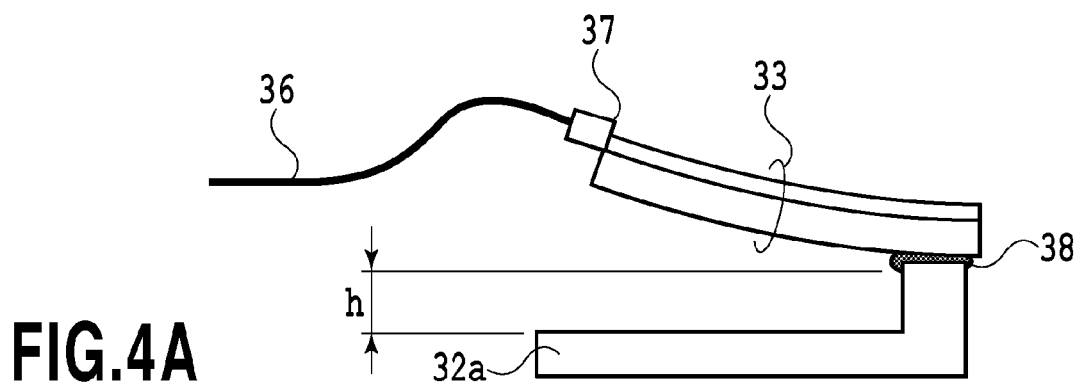
FIGS. 4A to 4D illustrate a method for fixing the planar lightwave circuit in accordance with First Embodiment.
Figure 4B:
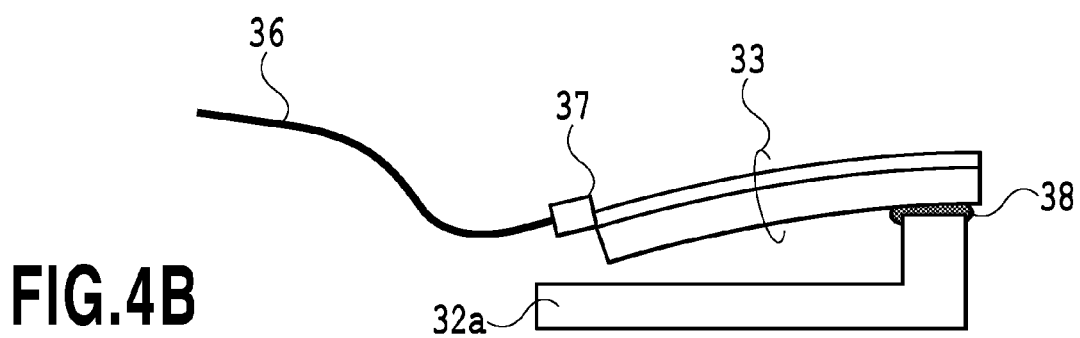

FIGS. 4A to 4D illustrate a method for fixing the planar lightwave circuit in accordance with First Embodiment. The method for fixing the planar lightwave circuit 33 illustrated in FIG. 3 will now be described in detail. The silica glass layer 33b of the planar lightwave circuit 33 comprises a region 33y formed of an optical interferometer as an optical functional circuit and a waveguide region 33x formed only of an optical waveguide (not formed of an optical interferometer) that is in contact with a side forming an emission-end face of the optical wavelength for propagating the emitted light to the lens 34 (see FIG. 4D). The fixing mount 32a has an inverted L-shape or a hook shape in a side view as illustrated in FIGS. 4A and 4B, and is provided to secure only the waveguide region 33x (see FIG. 4D) in the optical circuit on the planar lightwave circuit by an adhesive 38.

At this time, the bottom of the substrate at the lower part of the waveguide region 33x of the planar lightwave circuit 33 is in parallel with the upper surface of the fixed part of the fixing mount 32a. In addition, the side of the waveguide region 33x where the emission-end face is formed is projected outward from the side of the fixed part of the fixing mount 32a by a length which is approximately 100 times the thickness of the adhesive 38 (see FIG. 4C). This allows to secure the position of the emission-end of the waveguide region 33x without any warping changes of the planar lightwave circuit 33 due to thermal changes (see FIGS. 4A and 4B) and without any positional changes in horizontal direction (with respect to the circuit plane of the planar lightwave circuit 33) due to thermal expansion. The lens 34 and the light-receiving element 35 are also fixed to the fixing mount (see FIG. 3), thereby preventing displacement of an optical axis due to thermal changes.

The region 33y in the optical interferometer of the planar lightwave circuit 33 is not fixed to the fixing mount 32a and is held above the fixing mount 32a. The planar lightwave circuit 33 has a shape which can be changed as desired regardless of any warping due to thermal changes (see FIGS. 4A and 4B) and is insusceptible to stresses.

The stress or stress changes caused by implementation induces birefringence changes in the optical wavelength. The optical interferometer is sensitive to the birefringence changes and is susceptible to property degradation. Thus, the property can be stabilized by not fixing the region 33y of the optical interferometer to the fixing mount 32a. The wavelength region 33x, on the other hand, is fixed to the fixing mount 32a. However, the planar lightwave circuit 33 has a small effect of stresses due to warping changes compared to the case where the entire surface of the planar lightwave circuit is fixed to the fixing mount. As a result, the property degradation due to the birefringence changes can be reduced.

The part of the fixing mount 32a where the planar lightwave circuit 33 is not fixed (unfixed part) is required to provide difference in height from the fixed part such that the planar lightwave circuit 33 and the upper surface of the unfixed part are not in contact even if warping change of the planar lightwave circuit 33 is caused due to thermal changes. Otherwise, if the planar lightwave circuit 33 is in contact with the fixing mount 32a as a result of a warping change, stress to the substrate is generated and this leads to property degradation. If the planar lightwave circuit 33 is formed of an Si substrate and a silica-based glass material, the height difference h of approximately 100 μm is required to be provided between the unfixed part and the fixed part (see FIG. 4A).

Figure 4C:
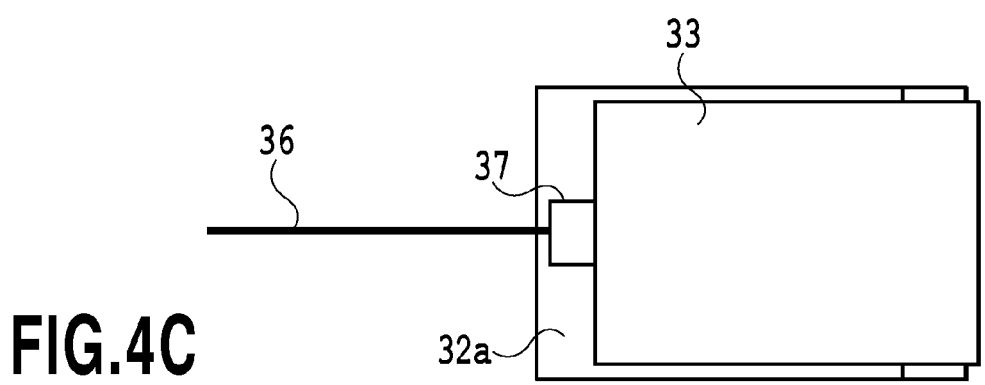
Figure 4D:
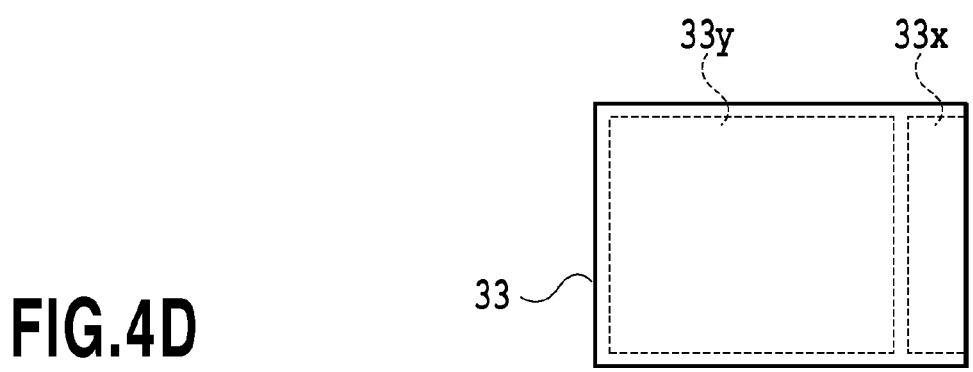

The emission-end face of the waveguide region 33x is preferred to be coincident with the side of the fixed part of the fixing mount 32a or to be projected rather outward therefrom (in FIG. 4C, it is preferred that the planar lightwave circuit 33 is displaced to the right from the side of the fixed part of the fixing mount 32a). Even if the emission-end face is disposed inward from the side of the fixed part (in FIG. 4C, even if the planar lightwave circuit 33 is displaced to the left from the side of the fixed part of the fixing mount 32a), a similar effect can be obtained. However, in such a case, the fixing adhesive 38 is more likely to be spread onto the emission-end face. Thus, the implementation of the planar lightwave circuit 33 becomes more difficult due to the need for providing a thick substrate and the need for applying the adhesive 38 in as thin a layer as possible by preventing the adhesive overflow.

Meanwhile, if the emission-end face of the waveguide region 33x is projected outward from the side of the fixed part of the fixing mount 32a by a length which is more than 1000 times greater than the thickness of the adhesive 38 (5 to 20 μm), the displacement of the emission-end face of the waveguide region 33x becomes considerably large with respect to the optical axis when warping change of the planar lightwave circuit 33 is caused due to thermal changes. Therefore, the projected length of the emission-end face which is projected outward from the side of the fixed part may be more than 0 times and less than 1000 times the thickness of the adhesive 38 which is the rough indication of the amount of the overflowing adhesive 38 after the adhesion. If the projected length is more than 10 times and less than 500 times the thickness of the adhesive 38, the adhesive can be absolutely prevented from spreading onto the emission-end face without being affected by any warping.

The above is given as only one example where the planar lightwave circuit 33 is formed of an Si substrate and a silica-based glass material. The planar lightwave circuit 33 may be entirely formed of a semiconductor material or a glass-based material, or it may be formed of a dielectric material such as $LiNbO_3$. In either case, the effect of stresses caused by implementation of the planar lightwave circuit and by thermal changes can be suppressed.

Second Embodiment

Figure 5:
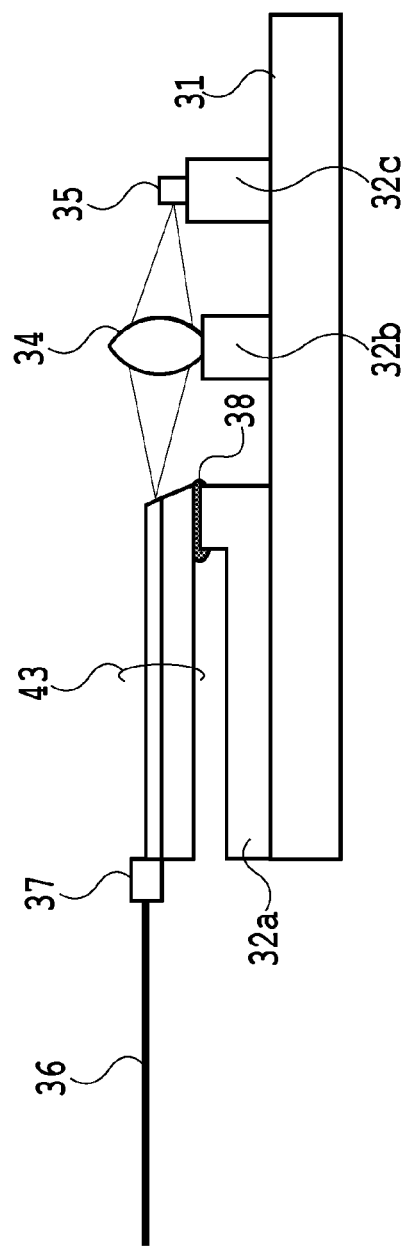
FIG. 5 illustrates the inner structure of the integrated optical receiver in accordance with Second Embodiment of the present invention.

FIG. 5 illustrates the inner structure of the integrated optical receiver in accordance with Second Embodiment of the present invention. The difference from the integrated optical receiver of First Embodiment is the planar lightwave circuit 43. The emission-end face of the waveguide region in the planar lightwave circuit 43 is obliquely processed in vertical direction with respect to the circuit plane of the planar lightwave circuit 43. Such oblique processing allows to suppress reflection at the emission-end face. In doing so, the positional relationship between the lower side of the emission-end face of the waveguide region and the side of the fixed part of the fixing mount 32a may conform to First Embodiment.

Third Embodiment

Figure 6A:
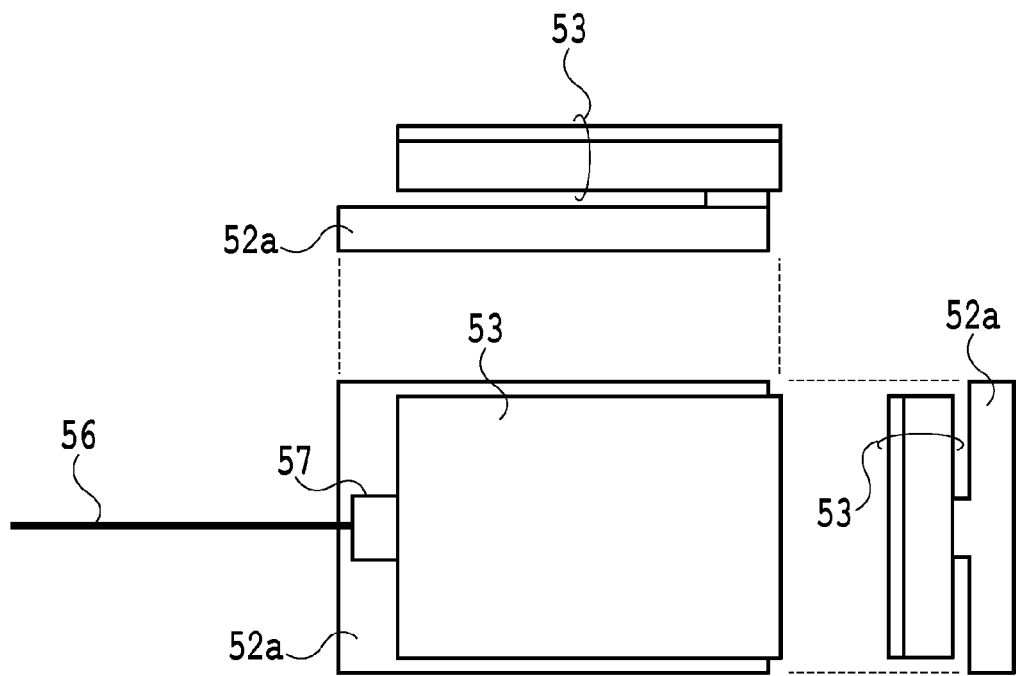
FIGS. 6A and 6B illustrate a method for fixing the planar lightwave circuit in accordance with Third Embodiment.
Figure 6B:
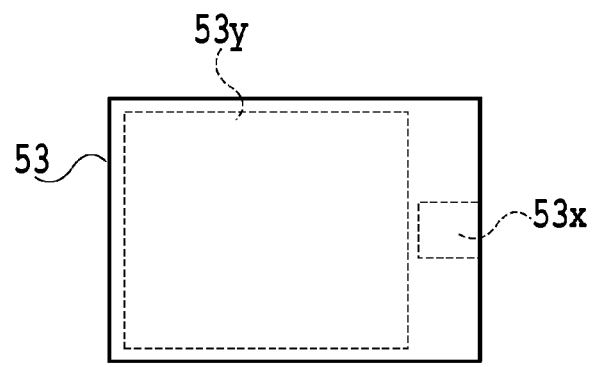

FIGS. 6A and 6B illustrate a method for fixing the planar lightwave circuit in accordance with Third Embodiment. The planar lightwave circuit and the fixed part of the fixing mount can be further limited to prevent degradation of properties upon thermal changes and implementation. As illustrated in FIG. 6A, in particular, a fixing mount 52a with a fixed part having a limited shape is used instead of the fixing mount 32a of First Embodiment illustrated in FIG. 4. As illustrated in FIG. 6B, the waveguide region 53x in the planar lightwave circuit 53 is limited to a portion at the side of the emission-end face in accordance with the shape of the fixed part of the fixing mount 52a such that the position of the emission-end face in the waveguide region 53x can be fixed without any positional changes in horizontal direction due to thermal expansion. In contrast to First and Second Embodiments, this allows to further reduce stresses generated by implementation and stress changes caused by thermal changes.

The positional relationship between the emission-end face in the waveguide region 53x and the side of the fixed part of the fixing mount 52a may conform to First Embodiment.

FIGS. 7A and 7B illustrate stress analysis of the planar lightwave circuit in accordance with First and Third Embodiments. FIG. 7A illustrates an analysis by the fixing method of First Embodiment illustrated in FIG. 4. FIG. 7B illustrates an analysis by the fixing method of Third Embodiment illustrated in FIG. 6. The planar lightwave circuit 33 is a 22.5 mm square and the size of the fixed part of the fixing mount 32a is 22.5 mm×3.0 mm with the height difference h between the unfixed part and the fixed part determined as h=0.1 mm. The planar lightwave circuit 53 is also a 22.5 mm square and the size of the fixed part of the fixing mount 52a is 5.0 mm×3.0 mm with the height difference h between the unfixed part and the fixed part determined as h=0.1 mm. In either case, the fixing mount is formed of kovar and the planar lightwave circuit is formed of a silica glass layer having a thickness of 40 μm deposited on an Si substrate having a thickness of 1 mm.

FIGS. 7A and 7B illustrate stress change of the planar lightwave circuit which is caused by change in the ambient temperature from 25° C. to 85° C. The analysis of FIG. 7A illustrates that the part of the fixing mount for fixing the planar lightwave circuit is limited to the waveguide region such that the region of the optical interferometer is not affected by stresses. With additional reference to FIG. 7B, it is recognized that the effect of stresses is reduced and is limited to a certain region by limiting the waveguide region and the fixed part. Based on the above, the property change in the optical interferometer caused by implementation of the planar lightwave circuit and by thermal changes can be limited.

Fourth Embodiment

In First to Third Embodiments, the planar lightwave circuit is fixed directly to the fixing mount. In general, a fixing mount is composed of metal while a substrate of a planar lightwave circuit is usually composed of an Si substrate and the like. Thus, there is a difference between their thermal expansion coefficients. As a result, distortion is produced by difference in the amount of expansion or contraction upon change in the ambient temperature. In First to Third Embodiments, the waveguide region in the planar lightwave circuit insusceptible to the distortion is fixed to the fixing mount. However, if the distortion is required to be reduced further, the planar lightwave circuit and the fixing mount are fixed through an intermediate fixing mount composed of a material which is different from that of the fixing mount as described in Fourth Embodiment.

Figure 8A:
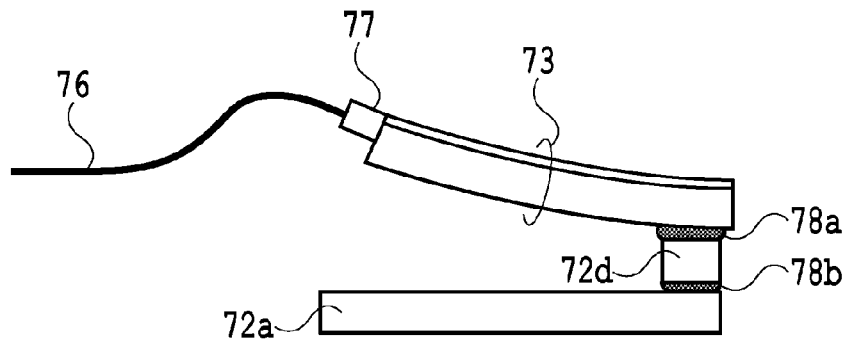
FIGS. 8A and 8B illustrate a method for fixing the planar lightwave circuit in accordance with Fourth Embodiment.
Figure 8B:
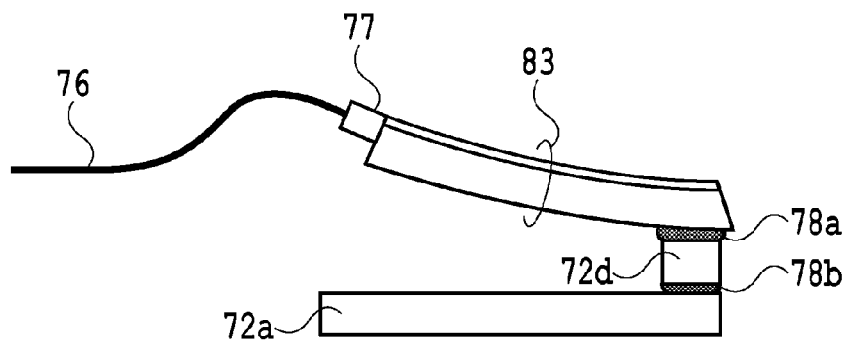

FIGS. 8A and 8B illustrate a method for fixing the planar lightwave circuit in accordance with Fourth Embodiment. FIG. 8A illustrates that the planar lightwave circuit 73 is fixed to the fixing mount 72a through the intermediate fixing mount 72d. The thermal expansion coefficient of the intermediate fixing mount 72d is closer in value to the thermal expansion coefficient of the substrate of the planar lightwave circuit 73 (e.g., Si substrate) than that of the fixing mount 72a. In addition, the value intermediate between the thermal expansion coefficient of the substrate of the planar lightwave circuit 73 and the thermal expansion coefficient of the fixing mount 72a or the value equivalent to the thermal expansion coefficient of the substrate of the planar lightwave circuit 73 is preferred.

If the intermediate value is taken as the value of the thermal expansion coefficient of the intermediate fixing mount 72d, each distortion in the fixing mount 72a and the planar lightwave circuit 73 is reduced.

Meanwhile, if priority is given to prevent property degradation in the optical interferometer of the planar lightwave circuit 73, the intermediate fixing mount 72d is formed of a material having the same thermal expansion coefficient as the substrate of the planar lightwave circuit to possibly avoid distortion toward the optical interferometer. The intermediate fixing mount 72d and the substrate of the planar lightwave circuit 73 are typically formed of the same material. This allows to prevent displacement of an optical axis due to thermal changes and property degradation in the optical interferometer upon implementation.

As described above, the planar lightwave circuit 83 with an obliquely processed emission-end face may be fixed to the intermediate fixing mount 72d as illustrated in FIG. 8B so as to suppress reflection at the emission-end face of the waveguide region in the planar lightwave circuit.

The emission-end face of the waveguide region in each of the planar lightwave circuits 73 and 83 is preferred to be coincident with the side of the intermediate fixing mount 72d or to be projected rather outward therefrom (in FIGS. 8A and 8B, it is preferred that the planar lightwave circuits 73 and 83 are displaced to the right from the side of the intermediate fixing mount 72d). Even if the emission-end face is disposed inward from the side of the intermediate fixing mount 72d (in FIGS. 8A and 8B, even if the planar lightwave circuits 73 and 83 are displaced to the left from the side of the intermediate fixing mount 72d), a similar effect can be obtained. However, in such a case, the fixing adhesive 78a is more likely to be spread onto the emission-end face. Thus, the implementation of the planar lightwave circuits 73 and 83 becomes more difficult due to the need for providing thick substrates and the need for applying the adhesive 78a in as thin a layer as possible by preventing the adhesive overflow.

Meanwhile, if the emission-end face of the waveguide region in each of the planar lightwave circuits 73 and 83 is projected outward from the side of the fixed part of the intermediate fixing mount 72d by a length which is more than 1000 times greater than the thickness of the adhesive 78a (5 to 20 μm), the displacement of the emission-end face of the waveguide region becomes considerably large with respect to the optical axis when warping change of the planar lightwave circuits 73 and 83 is caused due to thermal changes. Therefore, the projected length of the emission-end face which is projected outward from the side of the fixed part may be more than 0 times and less than 1000 times the thickness of the adhesive 78a which is the rough indication of the amount of the overflowing adhesive 78a after the adhesion. If the projected length is more than 10 times and less than 500 times the thickness of the adhesive 78a, the adhesive can be absolutely prevented from spreading onto the emission-end face without being affected by any warping.

Fifth Embodiment

Figure 9A:
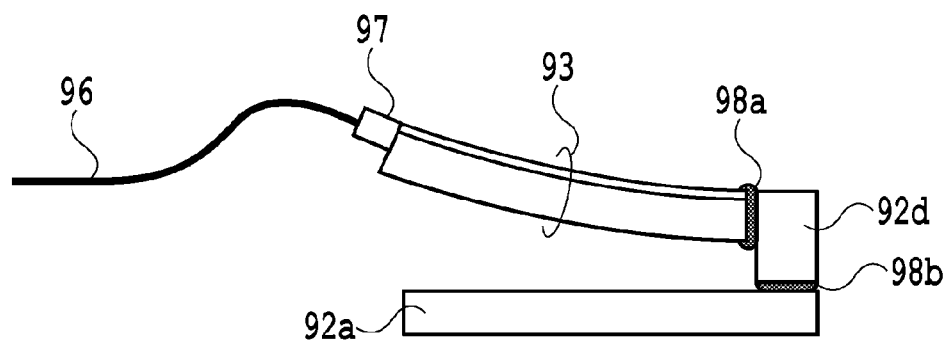
FIGS. 9A and 9B illustrate a method for fixing the planar lightwave circuit in accordance with Fifth Embodiment.
Figure 9B:
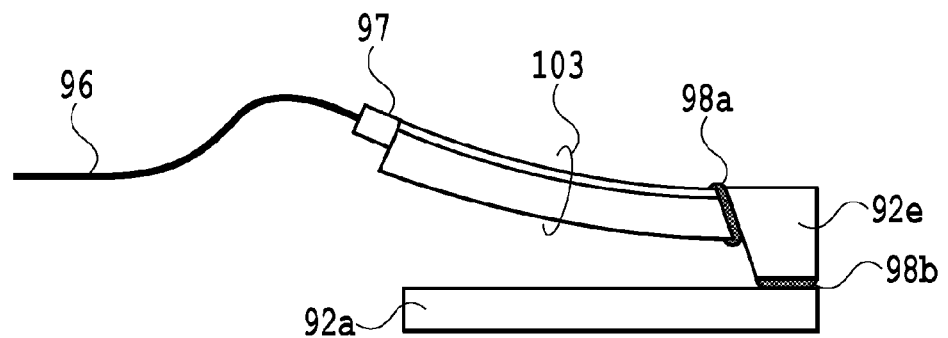

FIGS. 9A and 9B illustrate a method for fixing the planar lightwave circuit in accordance with Fifth Embodiment. A transparent material is applied to the intermediate fixing mount used in Fourth Embodiment so as to secure the emission-end face of the waveguide region in the planar lightwave circuit to the intermediate fixing mount. As illustrated in FIG. 9A, the intermediate fixing mount 92d is fixed to the upper surface of the fixing mount 92a by the adhesive 98b. The emission-end face of the waveguide region in the planar lightwave circuit 93 is fixed directly to the side of the intermediate fixing mount 92d by the adhesive 98a. The light emitted from the planar lightwave circuit 93 is coupled to the lens and the light-receiving element by transmitting through the intermediate fixing mount 92d.

With this method, stresses generated by implementation of the planar lightwave circuit can be minimized and the property degradation in the planar lightwave circuit can be inhibited. Further, displacement of an optical axis due to warping changes is minimized in this configuration. The transparent material herein is a material without losses such as absorption around the wavelength used in the planar lightwave circuit, and silica is the preferred material.

As described above, the planar lightwave circuit 103 with an obliquely processed emission-end face may be fixed to the intermediate fixing mount 92e as illustrated in FIG. 9B so as to suppress reflection at the emission-end face of the waveguide region in the planar lightwave circuit.

Sixth Embodiment

Figure 10C:
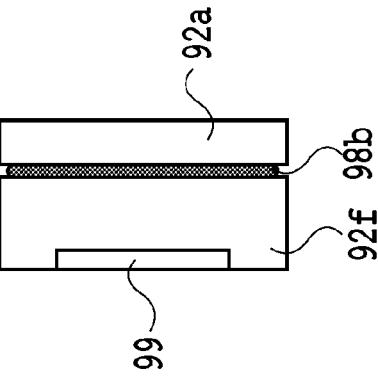
FIGS. 10A to 10C illustrate a method for fixing the planar lightwave circuit in accordance with Sixth Embodiment.
Figure 10A:
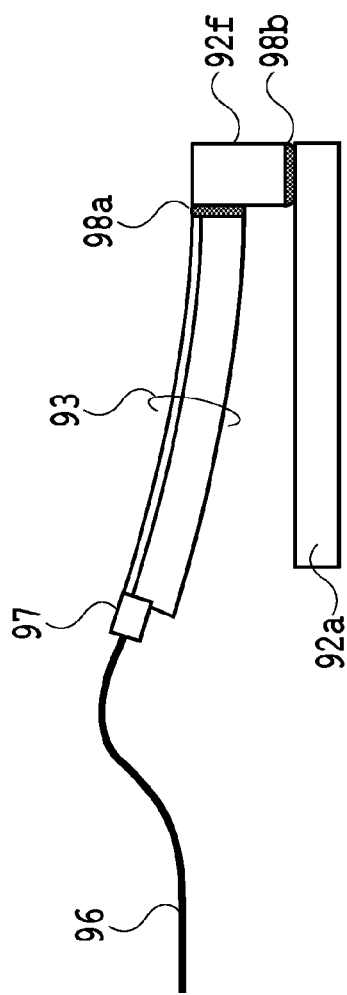
Figure 10B:
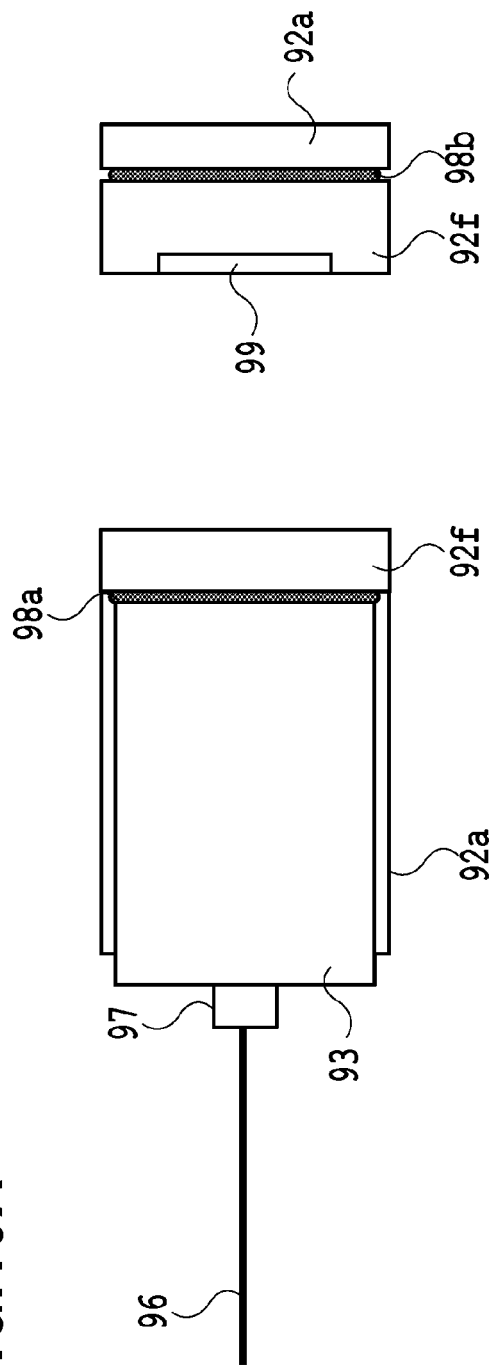

FIGS. 10A to 10C illustrate a method for fixing the planar lightwave circuit in accordance with Sixth Embodiment. A window composed of a transparent material for transmitting emitted light is formed in the part of the intermediate fixing mount used in Fourth Embodiment. The emission-end face of the waveguide region in the planar lightwave circuit is fixed to be coincident with the window of the intermediate fixing mount. The intermediate fixing mount 92f is fixed to the upper surface of the fixing mount 92a by the adhesive 98b. The emission-end face of the waveguide region in the planar lightwave circuit 93 is fixed directly to the side of the intermediate fixing mount 92f by the adhesive 98a. The light emitted from the planar lightwave circuit 93 is coupled to the lens and the light-receiving element by transmitting through the window 99 of the intermediate fixing mount 92f.

With this method, stresses generated by implementation of the planar lightwave circuit can be minimized and the property degradation in the planar lightwave circuit can be inhibited. Further, displacement of an optical axis due to warping changes is minimized in this configuration. The transparent material herein is a material without losses such as absorption losses around the wavelength used in the planar lightwave circuit, and silica can be used as this material. As long as the planar lightwave circuit 93 and the intermediate fixing mount 92f can be fixed, optical signals may be transmitted through either the hollow constructed window 99 or a cutout in the surface of the intermediate fixing mount 92f. Sixth Embodiment exemplifies the case where a window is formed in the part of the intermediate fixing mount. However, the window can be formed in the fixed part of the fixing mount instead of the intermediate fixing mount.

Seventh Embodiment

A phase shifter may be required in some types of the optical interferometers. In general, a heater formed on the upper part of the waveguide is provided for the phase shifter. The phase shifter is provided to cause refractive index change by locally heating the waveguide and to shift the phase of the light transmitting through the waveguide. If such a phase shifter is disposed in the optical interferometer, generated heat needs to be efficiently dissipated outside the planar lightwave circuit, otherwise the temperature of the planar lightwave circuit itself may be raised too high and may be increased over an upper temperature limit.

Figure 11:
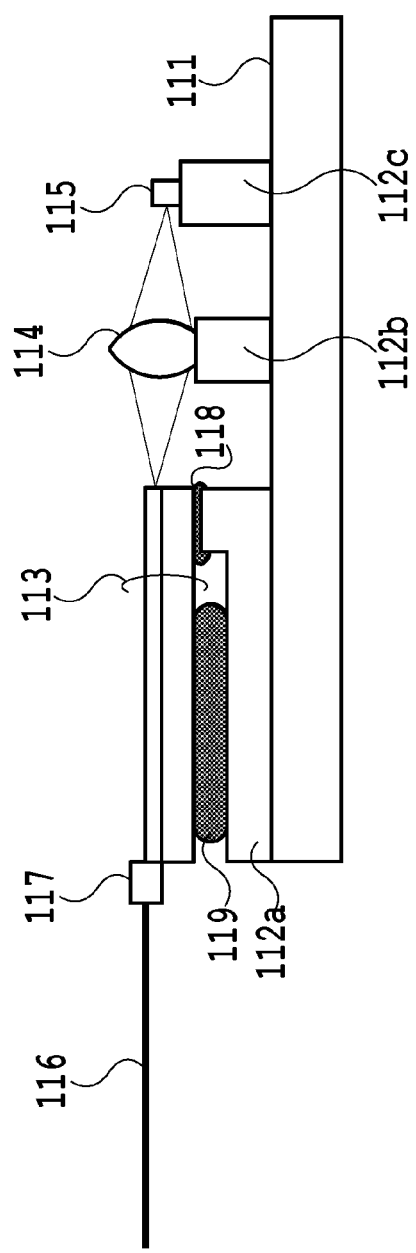
FIG. 11 illustrates the inner structure of the integrated optical receiver in accordance with Seventh Embodiment of the present invention.

FIG. 11 illustrates the inner structure of the integrated optical receiver in accordance with Seventh Embodiment of the present invention. A planar lightwave circuit 113, a lens 114, and a light-receiving element 115 are respectively fixed to the base substrate 111 by fixing mounts 112a, 112b, and 112c serving as the supporting members. The optical fiber 116 and the planar lightwave circuit 113 are connected through the optical fiber fixing component 117. Further, a highly heat conductive paste 119 is disposed between the substrate at the bottom of the used region of the optical interferometer in the planar lightwave circuit 113 and the upper surface of the unfixed part of the fixing mount 112a.

As a result, the heat generated on the planar lightwave circuit 113 can be released outside the package of the integrated optical receiver through the heat conductive paste 119 and the fixing mount 112a. In addition, the heat conductive paste 119 is deformable and is deformed in accordance with the warping change of the planar lightwave circuit 113 due to change in the ambient temperature. This allows to reduce unnecessary stresses to the planar lightwave circuit 113. The heat conductive paste is used in Sixth Embodiment but it may be any materials in the form of paste, rubber, or gel as long as it is highly heat conductive and is deformable to some extent.

A material in the form of paste, rubber, or gel which is highly heat conductive and deformable to some extent is used for dissipating the heat from the planar lightwave circuit through the fixing mount in the configuration of the above embodiment. Such configuration is applicable to other embodiments.

INDUSTRIAL APPLICABILITY

The present invention can be used in an optical communication device in an optical transmission system, and in particular, in an integrated receiver for receiving a phase-modulated optical signals.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A planar lightwave circuit having a waveguide-type optical functional circuit formed on a substrate, the planar lightwave circuit comprising:
    a waveguide region formed only of an optical waveguide that is in contact with a side forming an emission-end face of the optical waveguide for propagating the light emitted from the optical functional circuit or an incident-end face of an optical waveguide for propagating the light incident on the optical functional circuit,
    wherein only the portion of the bottom of the substrate on which the waveguide region is formed is fixed to an intermediate fixing mount, and
    wherein the intermediate fixing mount is provided to be fixed to a fixing mount for holding the planar lightwave circuit and a thermal expansion coefficient of the intermediate fixing mount is equivalent to the thermal expansion coefficient of the substrate or is closer in value to the thermal expansion coefficient of the substrate than the thermal expansion coefficient of the fixing mount.

2. The planar lightwave circuit according to claim 1, wherein the side forming the emission-end face is fixed to coincide with the side of the fixed part of the intermediate fixing mount or the side forming the emission-end face is fixed to project outward from the side of the fixed part of the intermediate fixing mount for the length less than 1000 times the thickness of the adhesive layer for fixing to the intermediate fixing mount.

3. An optical device comprising:
    a planar lightwave circuit comprising:
        a substrate having opposing top and bottom surfaces; and
        a waveguide-type optical functional circuit formed on the top surface of the substrate, the waveguide-type optical functional circuit having an end face for propagating light thereto or therefrom, the waveguide-type optical functional circuit comprising:
            a first region positioned on a first portion of the substrate, the first region comprising an optical waveguide abutting the end face; and
            a second region positioned on a second portion of the substrate;
    an intermediate fixing mount fixed to the planar lightwave circuit, the bottom of the first portion of the substrate being the only portion of the planar lightwave circuit fixed to the intermediate fixing mount; and
    a fixing mount on which the intermediate fixing mount is mounted to hold the planar lightwave circuit,
    wherein the intermediate fixing mount has a thermal expansion coefficient that is
        equivalent to a thermal expansion coefficient of the substrate or
        closer in value to the thermal expansion coefficient of the substrate than a thermal expansion coefficient of the fixing mount.

* * * * *